P. MUELLER.
LEAD PIPE CONNECTION.
APPLICATION FILED JULY 30, 1917.
1,372,363.
Patented Mar. 22, 1921
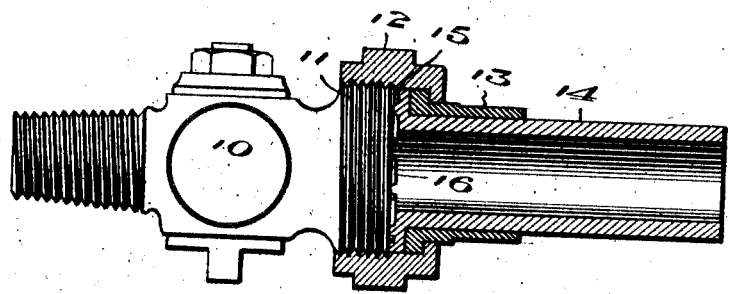
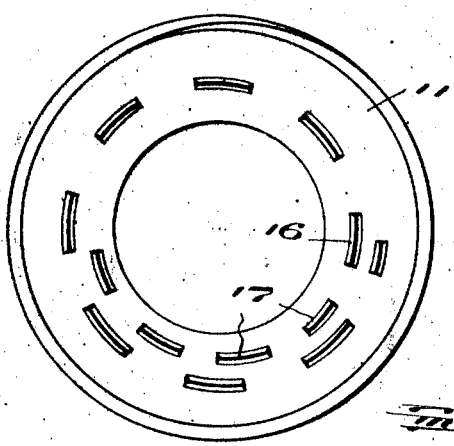
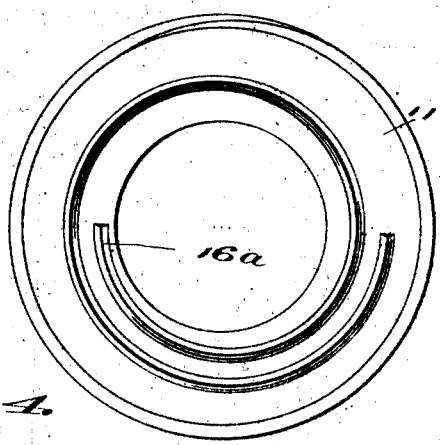
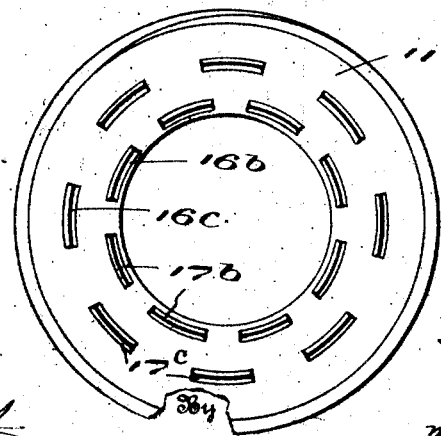
Inventor
Philip Mueller

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

LEAD-PIPE CONNECTION.

1,372,363.　　　　Specification of Letters Patent.　　Patented Mar. 22, 1921.

Application filed July 30, 1917.　Serial No. 183,620.

*To all whom it may concern:*

Be it known that I, PHILIP MUELLER, a citizen of the United States, residing at Decatur, in the county of Macon and State of Illinois, have invented new and useful Improvements in Lead-Pipe Connections, of which the following is a specification.

This invention has reference to an improved pipe coupling wherein one member of the coupling is relatively soft and the opposite member is relatively hard or unyielding, and relates particularly to a coupling especially adapted for use between a corporation cock and a lead pipe. The broad objects and advantages of a coupling of the general character of this invention are set forth in Patent No. 1,194,766, granted Aug. 15, 1916, to Philip Mueller & Anton C. Schuermann.

The objects and advantages of this specific invention are to provide the end of a corporation cock with a rib or other projection against which the end of the soft pipe is adapted to be forced for the purpose of embedding the rib or projection into the pipe end or a flange on the end of the pipe, and offsetting portions of the rib, as by arranging the rib spirally upon the end of the cock whereby to bind the pipe in place and prevent turning of the same; or interrupting the rib to provide shoulders offsetting any attempt to turn the pipe; or both interrupting and offsetting the rib, to hold the pipe from turning unless by shearing off the end of the pipe or its flange.

While the present invention may be embodied in various forms of couplings, and in different constructions of the parts of the couplings, the following is a specific description of one embodiment of the invention, the same being illustrated in the accompanying drawings in which—

Figure 1 is a side elevation of the coupling partly in section.

Fig. 2 is a face view of the end or head of the corporation cock, in the present instance one member of the coupling.

Fig. 3 is a similar view disclosing a slight modification of the coupling.

Fig. 4 is a like view showing a further modification of the coupling.

Referring to these drawings, wherein like parts are designated by similar characters of reference throughout the several views, and referring particularly to Figs. 1 and 2, the improved coupling is disclosed in the present instance as between a corporation cock 10 having an enlarged end or head 11 externally screw-threaded to receive a coupling nut 12. The coupling nut 12 is flanged or reduced at its outer end to engage a sleeve or collar 13 carried upon the end of a lead or other soft pipe 14. The pipe 14 is provided with a flange 15 upon its inner end in the usual manner.

The invention may be embodied in various structures and is shown in Figs. 1 and 2 as comprising a spiral rib 16 located on the face of the head 11 and against which the pipe 14 and the lead flange 15 is adapted to abut. This rib 16 may be interrupted at intervals throughout its length, as shown in Figs. 1 and 2, to provide a plurality of spaced-apart projections 17 arranged spirally on the face of the head 11 and adapted to be embedded in the flange 15 or end of the pipe 14 when the latter is tightened up against the head 11.

From Fig. 3 of the drawings it will be noted that the spiral rib 16$^a$ may be continuous whereby to engage the end of the pipe 14 and its flange 15 in a continuous spiral line. In this instance when the pipe 14 is turned against the head 11 the entire rib 16$^a$ binds at all points throughout its length against the body of the pipe, thus providing an elongated abutting shoulder or face to stop the turning of the pipe 14.

The spirit of the invention may also be carried out in the structure shown in Fig. 4 of the drawings, wherein two concentric ribs 16$^b$ and 16$^c$ are arranged upon the face of the head 11 and are interrupted whereby to provide a plurality of spaced apart projections 17$^b$ and 17$^c$ alternately disposed in staggered relation in a circular line about the opening through the head 11. It is, of course, understood that any number of interrupted concentric or spiral ribs 16 may be disposed upon the face of the head 11 for the purpose of engaging the lead pipe and holding the same from turning with respect to the head.

It will be noted that the invention as here in set forth in the several modifications comprises a rib, or ribs on the face of the abutting head 11, which rib is either interrupted, or offset laterally by irregular formation, to provide abutting faces or shoulders for engagement with the body of the pipe and its flange to prevent the turning of the pipe when coupled to the head 11. Furthermore, the arrangement of ribs is such that the soft, moldable pipe end contacts with the penetrating edges of the rib or ribs immediately the parts are brought to position so that when the coupling nut or sleeve is tightened the spirally disposed rib elements are molded directly into the soft pipe without any displacement of the metal except the radial displacement due to the direct molding of the ribs into pipe ends. This results in embedding the ribs firmly in their seats in the lead pipe, giving a series of off-set holding means to engage the pipe and maintain it in proper position.

It is of course understood that this invention may be embodied in various other structures than the above set forth, the modifications being restricted only by the scope of the following claims.

What is claimed is:

1. A pipe coupling comprising a head having a flat abutting face, a curved rib on said flat face so disposed that portions of said rib overlap and are radially offset from each other, a relatively soft pipe provided with a flange the face of which is parallel and bears against said ribbed head, and a coupling nut rotatable relative to said head and pipe to draw said head and pipe together and embed the rib in said flange.

2. A pipe coupling comprising a head having a flat abutting face, a spirally curved rib on said flat face so disposed that portions of said rib overlap and are radially offset from each other, a relatively soft pipe provided with a flange the face of which is parallel and bears against said ribbed head, and a coupling nut rotatable relative to said head and pipe to draw said head and pipe together and embed the rib in said flange.

3. A pipe coupling comprising a head having a flat abutting face, a curved rib on said flat face formed of a series of circularly spaced sections, a relatively soft pipe provided with a flange to bear against said rib head, and a coupling nut rotatable relative to said head and pipe to draw said head and pipe together and embed the rib in said flange.

4. A pipe coupling comprising a head having a flat abutting face, a spirally curved rib on said face formed of a series of circularly and radially offset sections, a relatively soft pipe provided with a flange to bear against said rib head, and a coupling nut rotatable relative to said head and pipe to draw said head and pipe together and embed the rib in said flange.

5. A pipe coupling comprising a head having a flat abutting face, a spirally curved rib on said face formed of a series of circularly and radially offset sections, said sections being staggered circumferentially with respect to one another, a relatively soft pipe provided with a flange to bear against said rib head, and a coupling nut rotatable relative to said head and pipe to draw said head and pipe together and embed the rib in said flange.

In testimony whereof I have hereunto set my hand in presence of two subscribing witnesses.

PHILIP MUELLER.

Witnesses:
FRANK H. SCHUTZ.
HENRY PLATE.